March 27, 1934.  W. R. STERRETT  1,953,030
GLASS SHEARS
Filed Sept. 30, 1931
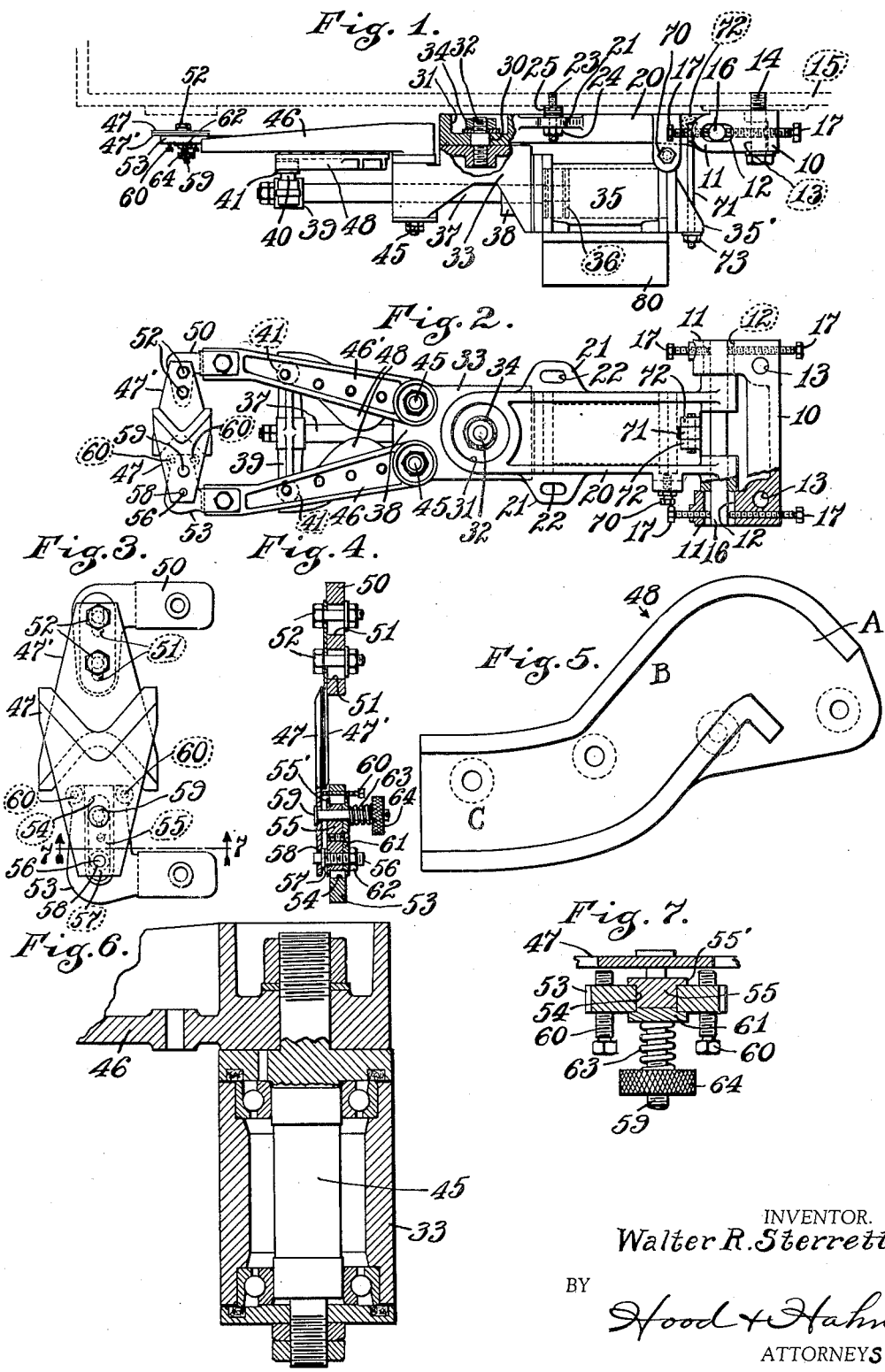
INVENTOR.
Walter R. Sterrett,
BY
Hood + Hahn
ATTORNEYS Patented Mar. 27, 1934

1,953,030

UNITED STATES PATENT OFFICE 1,953,030

GLASS SHEARS

Walter R. Sterrett, Muncie, Ind., assignor to Ball Brothers Company, Muncie, Ind., a corporation of Indiana Application September 30, 1931, Serial No. 566,014

3 Claims. (Cl. 49—14)

The object of my invention is to provide an efficient shearing mechanism particularly designed for use in severing desired successive masses from the lower end of a mass of molten glass depending from the submerged orifice of a delivery spout, the construction being such that the shear blades may be accurately positioned relative to the glass stream, and readily removable without adjustment disturbance, to facilitate orifice manipulation.

The accompanying drawing illustrates my invention.

Fig. 1 is a side elevation of an embodiment of my invention with adjacent portions of a feed spout indicated in dotted lines;

Fig. 2 is a plan of the shearing mechanism;

Fig. 3 a plan, on a larger scale, of the shear blades and adjacent parts;

Fig. 4 a vertical section showing the parts found in Fig. 3;

Fig. 5 a detail of one of the cams;

Fig. 6 a section through a shear arm fulcrum; and

Fig. 7 a section on line 7—7 of Fig. 3 on a larger scale.

In the drawing 10 indicates an anchor block having a pair of ears 11, 11 each horizontally slotted at 12, and provided with vertical perforations 13, 13, through which retaining bolts 14 may be passed into the usual bed plate 15 secured to or forming the basis of a feed spout.

Slidably mounted in slots 12 is a shaft 16 held in place by the four temper screws 17, the arrangement being such that shaft 16, and the parts supported thereby, may be laterally adjusted relative to the anchor block. Pivotally supported on shaft 16 is an arm 20 provided with lateral ears 21, 21, each slotted at 22 to receive a bolt 23 depending from plate 15 and having its lower end a removable nut 24 engaging the ear 21. The interposition of shims 25 between ears 21 and plate 15 will determine the vertical position of the outer end of arm 20. Arm 20 near its outer end is vertically perforated at 30 and pocketed in its upper surface, surrounding perforation 30, as indicated at 31. The perforation 30 receives a pivot pin 32 supporting the block 33, the upper end of pin 32 being threaded to receive a nut 34 in pocket 31.

Secured to the rear end of block 33 is an air cylinder 35 within which is mounted piston 36 carrying rod 37 projected through a bearing 38 carried by block 33 and provided at its outer end with a cross arm 39 at each end of which is an upwardly-projecting pin 40 upon which is journaled a roller 41.

Pivoted upon pins 45, 45, carried by block 33, are shear arms 46, 46' provided with coacting shear blades 47, 47', respectively. Secured to the under side of each shear arm is a cam 48 each adapted to receive one of the rollers 41.

Each cam 48 is a serpentine channel comprising a short rear section A, an intermediate section B, the medial line of which lies about 90° from the medial line of portion A, and a forward section C the medial line of which is slightly curved and the front end of which lies about 41° from the medial line of the section A. In the drawing, which is approximately to scale, the various parts of the cams and shear arms and blades are so proportioned that eminently satisfactory operation is obtained with the medial line of section A at an angle of about 45° from the medial line of the forward end of section C.

The two cams are symmetrically placed on opposite sides of the axis of the piston rod with the front ends of the medial lines of sections C parallel, the middle sections B rearwardly and inwardly inclined and the rear sections A outwardly and rearwardly inclined relative to the vertical axial plane of the piston rod.

An L-shaped plate 50 is secured to the outer end of arm 46' and its inwardly projecting arm is provided with a pair of aligned slots 51 through which are projected the clamping bolts 52 carried by the lower shear plate 47', said shear plate having a notched cutting edge.

An L-shaped plate 53 is secured to the outer end of arm 46 and its inwardly-projecting arm is provided with a slot 54 in which is slidably mounted a block 55 provided with flanges 55' engaging the upper surface of the slotted arm of plate 53. Threaded through block 55 is a pin 56 provided near its upper end with a circumferential collar 57. The upper end of pin 56 projects through the perforation 58 in the rear end of the upper shear blade 47, the rear end of said shear blade resting upon collar 57.

A yieldable clamping bolt 59 projects through blade 47 and block 55 and, between this bolt and the notched cutting edge of blade 47, said blade rests upon a pair of temper screws 60, 60 threaded through the inner end of the inwardly-projecting arm of plate 53. Sleeved over the lower ends of pin 56 and bolt 59 is a clamping plate 61 engaging the lower face of the inwardly-projecting arm of plate 53 and engaging this clamping plate is a nut 62, threaded on the lower end of pin 56, and a spring 63 sleeved over the lower end of bolt 59, said spring being provided with an adjustable abutment 64 threaded on the lower end of bolt 59. By axial adjustments of pin 56 and temper screws 60, the upper blade 47 may be accurately adjusted relative to the lower blade 47'.

In order to clamp the shear-carrying unit in operative position I provide a bolt 71 depending from ears 72, 72 on block 10, the lower end of which may be swung into a notch in bracket 35' of cylinder 35. The lower end of bolt 71 carries a nut 73 which may be clamped against bracket 35.

With the arms 20 so arranged, movement of pins 40 forwardly, away from cylinder 35 through cam-sections A will slowly start and accelerate movement of the shear blades from wide-open position; traverse of pins 40 through sections B will more rapidly move the blades to positions where stream cutting will begin; and traverse of pins 40 through cam-sections C will progressively decelerate movement of the blades, bringing them to closed position at zero velocity. The final severance of the glass stream therefore occurs with the shear blades moving toward each other relatively slowly so that the upper end of the severed gob of glass is not batted to one side by the under blade.

The two shear blades are accurately adjustable, by means of the construction shown, so that the final shearing action may be caused to occur at the axis of the glass stream.

Temper screw 70 provides an adjustable abutment for arm 33 and the stream-severing position of the cutting blades, from which position arm 33 and the parts carried thereby may be temporarily swung without disturbing the adjustment. The shear-carrying arm may be clamped in adjusted position by tightening nut 73. By loosening nut 73 and swinging hanger 71 away from bracket 35' the shears may be swung horizontally away from the glass stream to afford easy access to the flow orifice. By removing nuts 24 the entire shear mechanism may be swung downwardly upon shaft 16, thus affording easy access to the flow orifice. The shears may then be returned to original cutting position without readjustments.

Cylinder 35 will have associated therewith suitable valve mechanism 80 of well-known character by means of which reciprocation of piston 36 may be produced.

I claim as my invention:

1. In glass shears, a slotted arm, two temper screws carried by said arm on opposite sides of the axis of said slot, a block slidably mounted in said slot, a cutter blade laterally interlocked with said block and resting on said temper screws, and means for clamping said block and blade in adjusted position relative to said arm.

2. In glass shears, a slotted arm, two temper screws carried by said arm on opposite sides of the axis of said slot, a block slidably mounted in said slot, a cutter blade laterally interlocked with said block and resting on said temper screws, a clamping bolt extending through said blade and forming a support for said blade, a second bolt associated with the blade and block, and a spring associated with said last-mentioned bolt and acting to yieldingly hold the blade upon the temper screws.

3. In glass shears, a shear-carrying arm, a plurality of separated blade-supporting elements carried by said arm, some of said elements being adjustable transversely of the plane of movement of the arm, a cutter blade resting upon said blade-supporting elements, and spring means engaging said blade and arm to yieldingly hold the blade upon said supporting elements.

WALTER R. STERRETT.